Oct. 31, 1933.  J. C. GOOSMANN  1,933,257
METHOD AND APPARATUS FOR SPEED FREEZING
Filed July 16, 1931   3 Sheets-Sheet 3
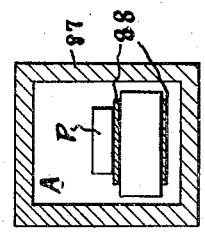
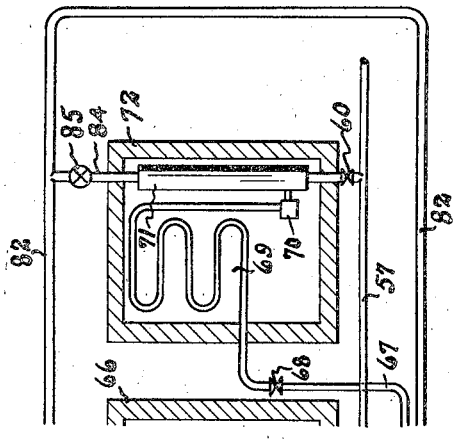
INVENTOR
Justus C. Goosmann
BY his ATTORNEYS Patented Oct. 31, 1933

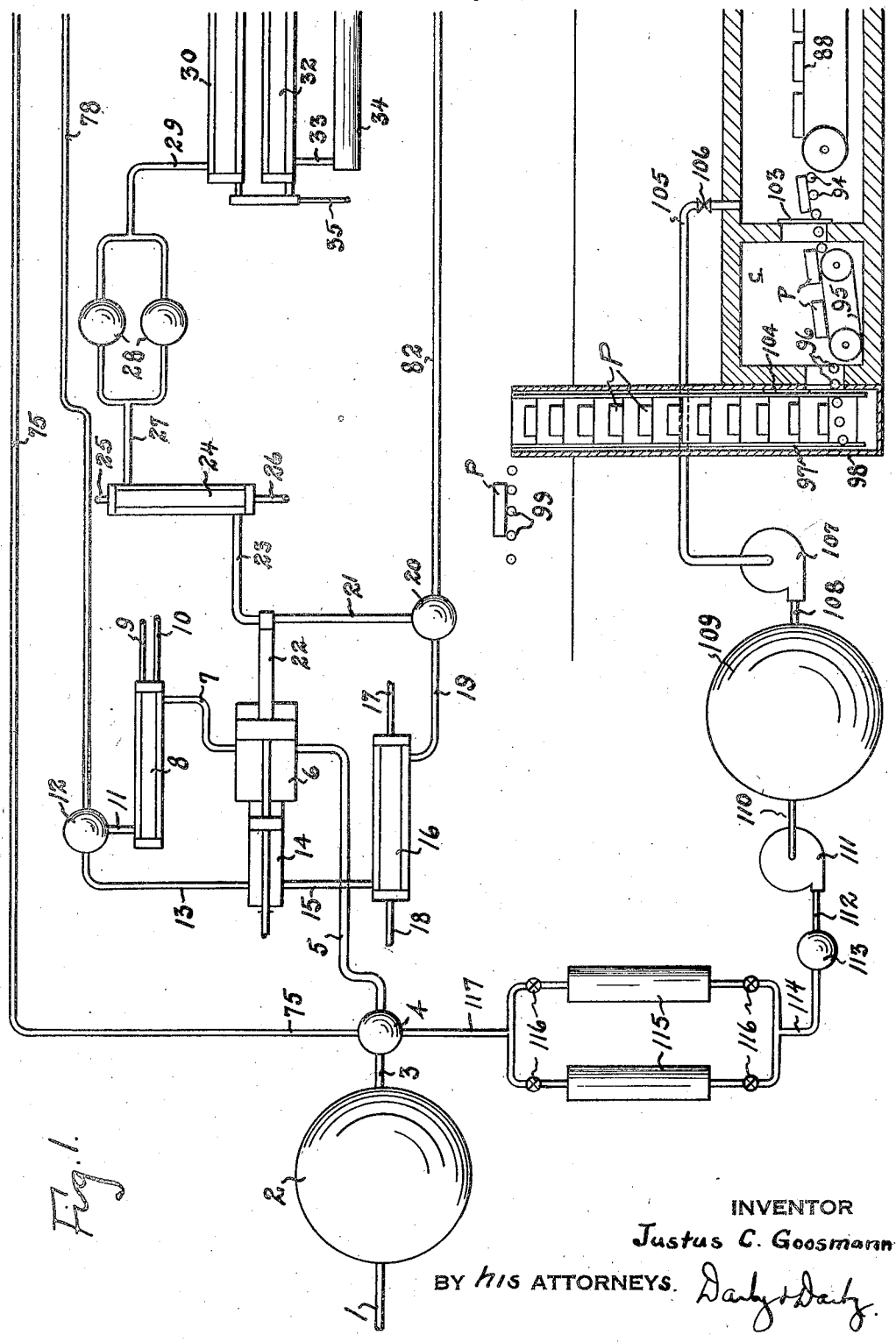

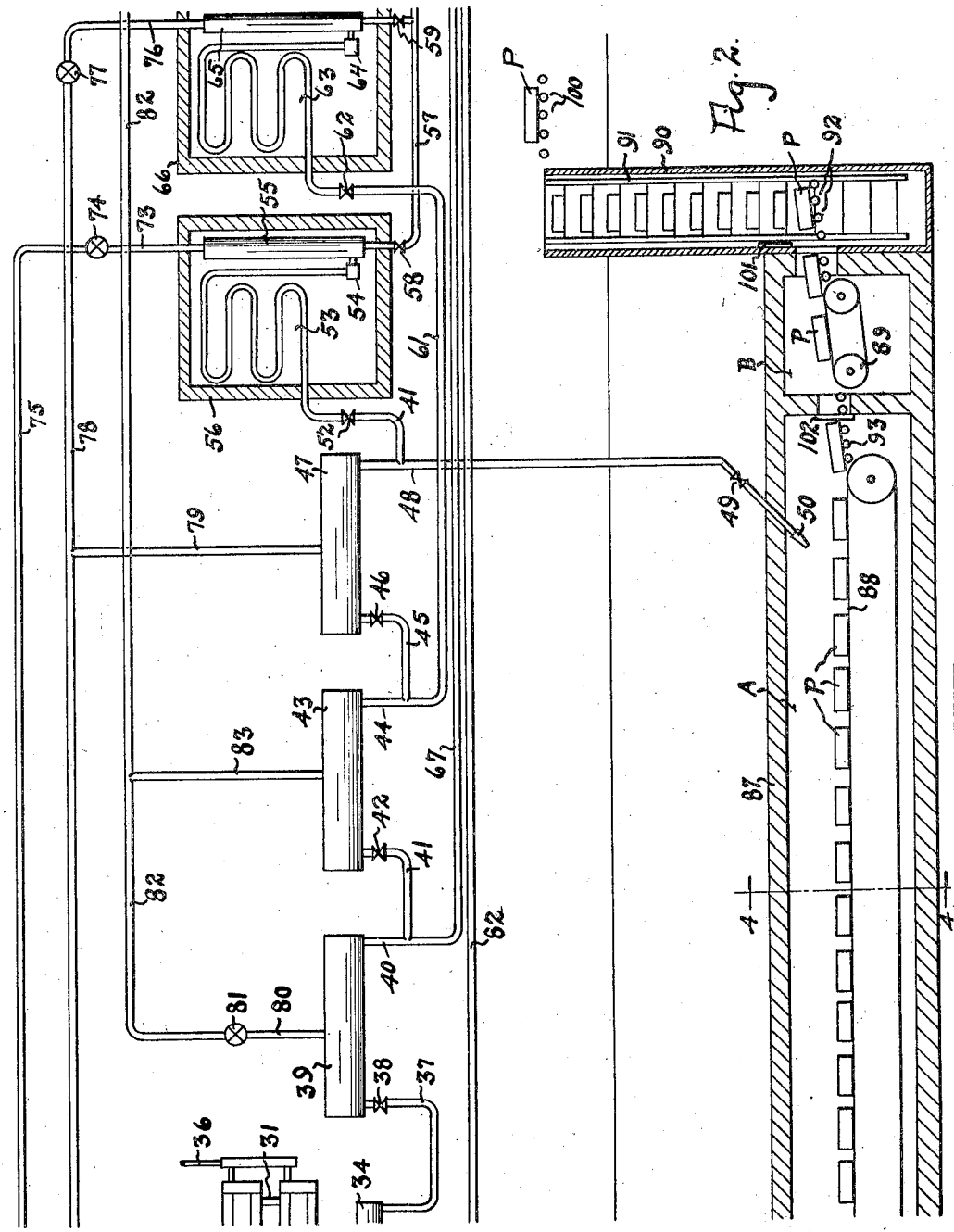

1,933,257

UNITED STATES PATENT OFFICE 1,933,257

METHOD AND APPARATUS FOR SPEED FREEZING

Justus C. Goosmann, Mount Vernon, N. Y., assignor to American Dryice Corporation, New York, N. Y., a corporation of New York Application July 16, 1931. Serial No. 551,169

8 Claims. (Cl. 62—91.5)

This invention relates in general to a method and apparatus for the speed freezing of perishable products.

One of the objects of this invention is to provide a method and apparatus by means of which perishable or similar products may be rapidly and quickly frozen or reduced in temperature to the desired degree.

Another object of this invention is to provide an apparatus and method for continuously freezing or chilling perishable products.

A still further object of this invention is to provide an apparatus and method by means of which perishable articles or products may be conducted through a spray of liquefied gas such as carbon dioxide gas and through a cold atmosphere of the gas to chill them to the desired degree.

A still further object of this invention is to provide a complete system in which carbon dioxide gas is reduced to a liquid state sprayed upon articles to be chilled, collected, purified and reliquefied.

A still further object is to provide in the same system a series of refrigerators maintained at different temperatures and supplied with liquid carbon dioxide from the same source at different temperatures to maintain the refrigerators at different temperatures.

A still further object is to provide a system operating in a closed cycle by means of which the carbon dioxide gas may be used over and over again.

These and many other objects as will appear from the following disclosure are secured by means of this invention.

This invention resides substantially in the combination, construction, arrangement and relative location of parts all as will be described in greater detail hereinafter.

Referring to the drawings—

Figures 1, 2 and 3 taken together represent diagrammatically the complete system of this invention with some parts shown in cross-section;

Fig. 4 is a cross-sectional view taken on the line 4—4 of Fig. 2.

This application relates in general to improvements upon the method and apparatus disclosed in my copending application serial No. 451,243 filed May 10, 1930. The general object is to provide a method and apparatus by means of which perishable products such as meats, fruits, vegetables and the like, and, in fact, any articles or materials which it is desired to freeze or chill may be rapidly frozen or chilled in a continuous process.

In addition, it is an object of this invention to provide in the complete system refrigerators in which the frozen and chilled products may be stored so that they will be maintained in that condition.

Another object of this invention is to provide a speed freezing apparatus and method by means of which the temperature of perishable products may be lowered so rapidly as to prevent the usual destructive effect of freezing such products. In addition, refrigerators are supplied as part of the apparatus for maintaining the products in a frozen condition to prevent the harmful effects of thawing and refreezing.

The apparatus comprising the invention will now be described in detail. At 1 is a supply pipe for the refrigerating gas such as carbon dioxide which connects any suitable source of the gas with a gasometer 2. The gasometer is connected by pipe 3 to a mixing cylinder 4 which merely consists of a closed tank of suitable preparation. This tank is connected by pipe 5 to the intake port of the first stage compressor 6. The discharge port of this compressor is connected by pipe 7 to a heat exchanger or cooler 8. Pipe 9 is the inlet pipe to the cooler for delivering cooling fluid thereto and pipe 10 is the discharge pipe for the cooling fluid. The cooler or heat exchanger 8 is connected by pipe 11 to a second mixing tank 12. This tank is connected by pipe 13 to the intake port of the second stage compressor 14, the discharge port of which is connected by pipe 15 to the second heat exchanger or cooler 16. The inlet and outlet pipes for the cooler 16 are shown at 17 and 18. The cooler 16 is connected by pipe 19 to a third mixing cylinder 20. This mixing cylinder is connected by pipe 21 to the intake port of the third stage compressor 22, the discharge port of which is connected by pipe 23 to the oil trap 24. Pipes 25 and 26 are the inlet and outlet pipes for the cooling fluid for this oil trap. The oil trap 24 is connected by pipe 27 through the filters 28 which, in turn, are connected by pipe 29 to the condensers 30 and 32 connected in series. The oil trap and filter are types well known in this art and may be obtained in many forms. Condenser 30 is connected in series with condenser 32 through pipe 31. Pipes 35 and 36 are the inlet and outlet pipes for the cooling fluid for the condensers. The coolers, heat exchangers and condensers are all of the same construction and are likewise well known in the art. They are of the type which comprises a shell closed off at each end and between which ends pipes extend so that the cooling fluid may flow through the pipes and the carbon dioxide to be cooled around the pipes.

Condenser 32 is connected by pipe 33 to the liquid receiver 34. This liquid receiver is connected by pipe 37 through a valve 38 to the flash tank 39. This tank is connected by pipes 40 and 41 through valve 42 to a second flash tank 43. This second flash tank is connected through pipes 44 and 45 and valve 46 to the third flash tank 47. The third flash tank is connected by pipe 48 through valve 49 to a discharge nozzle 50. Pipe 48 is connected by pipe 51 through the valve 52 to the refrigerating coil 53 in the first refrigerator 56. This refrigerating coil is connected through a float valve 54 to the liquid cylinder 55. Liquid cylinder 55 is connected through valve 58 and pipe 57 to the liquid cylinder 65 in the second refrigerator 66 through valve 59. Pipe 57 is also connected to the liquid cylinder 71 in refrigerator 72 through valve 60. Pipe 44 is connected by pipe 61 through valve 62 to the refrigerating coil 63 which, in turn, is connected through float valve 64 to liquid cylinder 65. Pipe 40 is connected by pipe 67 through valve 68 to the refrigerating coil 69 which, in turn, is connected through float valve 70 to the liquid cylinder 71.

Liquid cylinder 55 is connected through pipe 73, valve 74 and pipe 75 to the mixing cylinder 4. Liquid cylinder 65 is connected through pipe 76, valve 77 and pipe 78 to mixing cylinder 12. Flash tank 47 is connected by pipe 79 to pipe 78. Flash tank 39 is connected by pipe 80, valve 81 and pipe 82 to liquid cylinder 71 through valve 85 and pipe 84. Pipe 82 is also connected with mixing cylinder 20. Flash tank 43 is connected to pipe 82 by pipe 83.

At 87 is a speed freezer cabinet constructed to provide the freezing chamber A, the inlet chamber B and the outlet chamber C. Within chamber A is a continuous conveyor 88 of any suitable form. Within inlet chamber B is a small endless conveyor 89. Within the casing 90 is an endless conveyor 91 and a gravity conveyor 92 arranged to transfer the products P from the conveyor 91 to the conveyor 89. A gravity conveyor 93 transfers the products from conveyor 89 to conveyor 88. A gravity conveyor 94 transfers the products P from conveyor 88 to conveyor 95 in the outlet chamber C. Another gravity conveyor 96 transfers the products from conveyor 95 to the vertical conveyor 97 within the casing 98. A suitable conveyor 89 delivers the products to conveyor 91 from any suitable point and a similar conveyor 99 carries the frozen products from conveyor 97 to any suitable point. As is clear from Fig. 2 discharge nozzle 50 is disposed within chamber A adjacent the conveyor 88.

The casings 90 and 98 are in the form of enclosed shafts of considerable depth for the purpose of insuring that atmospheric air does not enter the speed freezer cabinet. It is, of course, practically impossible to prevent the escape of some carbon dioxide from the freezer into these shafts or chambers. However, in view of the greater specific weight of carbon dioxide gas it is possible by reason of these relatively deep shafts to prevent the entrance of air into the freezer. It is also possible to maintain a slight pressure in the freezer which will prevent the entrance of atmospheric air.

Suitable gates or doors 101, 102, 103 and 104 control the passages into the rapid freezer and between the various chambers thereof. The other end of chamber A opposite to that near which the nozzle is located is connected through valve 106 and pipe 105 to the suction port or blower 107. The discharge port of this blower is connected by pipe 108 to a gasometer 109. The gasometer 109 is connected by pipe 110 to the intake port or blower 111. The discharge port of this blower is connected by pipe 112 to the filter 113. This filter is connected by pipe 114 to the silica gel gas purifiers 115 which, in turn, are connected by pipe 117 to mixing cylinder 4. The purifier cylinders 115 are connected by branches having the control valves 116 so that they may be operated singly or in parallel.

Valves 38, 42 and 46 are of the well known double diaphragm pressure ratio type such as, for example, is described in my Patent No. 1,912,443 issued June 6, 1933. The valves 52, 62 and 68 are the well known pressure adjusting valves which need not necessarily be automatic. They can, of course, be of the diaphragm type. Valves 58, 59 and 60 are ordinary liquid drain valves for draining the liquid from the liquid cylinders when desired. Valve 49 is of the well known liquid expansion type and valve 106 is an ordinary hand valve.

In the operation of the system carbon dioxide gas is delivered from the source through pipe 1 to the gasometer 2. From the gasometer it flows through pipe 3 to mixing cylinder 4, through pipe 5 to the first stage compressor 6 where its pressure is raised and from which it is delivered through pipe 7 to the intercooler 8. After the heat of compression is removed therefrom it is delivered through pipe 11, mixing cylinder 12 and pipe 13 to the second stage compressor where its pressure is further raised. The gas is then delivered through pipe 15 to intercooler 16 where its heat of compression is removed. The cool gas then flows through pipe 19, mixing cylinder 20, pipe 21, the third or high pressure stage 22 and from there through pipe 23 to the water cooled oil trap 24 where the oil which it may have picked up is removed. It then flows through pipe 27 and the filters 28 where other impurities including condensed moisture is removed. The carbon dioxide is then delivered through pipe 39 to the condensers 30 and 32 where it is substantially all condensed to liquid form. From these condensers it is delivered into liquid cylinder 34, through pipe 33.

The liquid is then subjected to a gradual reduction in temperature and pressure by delivery in successive stages to the flash tanks 39, 43 and 47 through the pressure reducing valves 38, 42 and 46. From the last flash tank 47 the liquid is delivered through pipe 48, pressure reducing valve 49 and nozzle 50 through which it is discharged into chamber A which is maintained at substantially atmospheric pressure. The articles P of any desired nature are delivered to and through the liquid spray. They are conveyed by conveyor 1 and transferred to conveyor 90 which carries them on down to conveyor 92 over which they pass by conveyors 89 and 93 to conveyor 88. This conveyor carries them through the liquid spray so that the liquid carbon dioxide is sprayed directly thereon. The liquid being discharged into a condition of substantially atmospheric pressure undergoes a transformation instead, a portion thereof being transformed into solid carbon dioxide in the form of fine particles usually termed carbon dioxide snow and the remainder is transformed into exceedingly cold carbon dioxide gas which fills the chamber A. The snow collects on the articles which together with the cold gas in the chamber acts to chill and/or freeze the products P. Conveyor 88 carries the products to conveyor 94 from which they are transferred by conveyors 95, 96 and 97 to the conveyor 99. The gas formed in the chamber A is delivered through pipe 105 and blower 107 to the gasometer 109 where it is collected. As required the gas is withdrawn from this gasometer by blower 111 and discharged through filter 113 and purifiers 115 to mixing cylinder 4 for further liquefaction and use. Thus the gas from gasometer 109 mixes with the fresh incoming gas from gasometer 2 in the mixing chamber 4 where the new or fresh gas is partially cooled by the relatively colder gas coming from gasometer 109.

Liquid carbon dioxide is also delivered from pipe 48 through pipe 51, pressure reducing valve 52 to the refrigerating coil 53. From this coil the liquid is discharged into a float valve 54 of any suitable construction which maintains a desired liquid level within the liquid cylinder 55. In a similar manner liquid carbon dioxide at different temperatures and pressures are delivered to the other refrigerating coils 63 and 69 from the flash tanks 39 and 43. As soon as the liquid in the flash tanks 39, 43 and 47 is at relatively lower temperatures respectively, refrigerators 56, 66 and 72 are maintained at corresponding temperature wherein refrigerator 56 is maintained at the lower temperature and refrigerator 72 is maintained at the highest temperature. The gas formed in the liquid cylinder 55 is delivered through valve 74 where its pressure is reduced to the proper value for admixture with the gas in mixing cylinder 4 by delivery through pipe 75. Thus the cold gas from liquid cylinder 55 is again supplied for recompression and liquefaction and acts to further cool the gas which it mixes with in the mixing cylinder. In a similar manner the gas formed in liquid cylinder 65 is delivered through pipe 78 together with the gas formed in flash tank 47 delivered to pipe 78, through pipe 79 to mixing cylinder 12. Similarly the gas formed in liquid cylinder 71 and flash tanks 39 and 43 is delivered through pipe 82 to mixing cylinder 20. Pressure reducing valve 81 and pressure reducing valve 85 reduce the pressure of the gas which flows through them to the same pressure and the proper pressure for delivery to mixing cylinder 20. Likewise pressure reducing valves 74 and 77 deliver the gas at proper pressure for introduction into mixing cylinders 4 and 12 respectively.

The products as refrigerated in chamber A may be stored in the refrigerators where they will be maintained at the proper temperature or, of course, any desired articles may be kept in these refrigerators.

The whole system comprises a substantially closed cycle in which the same carbon dioxide while being used over and over again is employed for doing a number of refrigerating jobs at different temperatures. In addition, the apparatus is devised to provide a substantially continuous operation. Pipe 57 may be connected to any suitable point for removal of the liquid from the liquid cylinders when desired and particularly when too much liquid accumulates in these cylinders. Valves 58, 59 and 60 are liquid drain valves for delivering the carbon dioxide from these cylinders into pipe 57.

By way of illustration the temperature and pressure of the carbon dioxide in the various parts of the system will be set forth as indicating one desirable operating condition without in any sense limiting the method and apparatus to those temperature and pressure operating conditions. The carbon dioxide gas is delivered to the gasometer 2 at 80° F. and a pressure of four pounds gauge. From the mixing cylinder 4 the gas passes through pipe 5 at the same pressure and a temperature of 79° F. to the first stage compressor. This slight reduction in temperature is effected by reason of the admixture with the warmer gas of colder gas coming through pipe 75. The carbon dioxide is delivered from the first stage compressor at a pressure of 90 pounds and a temperature of 314° F. It is delivered from the intercooler 8 at a temperature of 80° F. This change in temperature, of course, being controlled by the rate of heat exchange with the cooling liquid in the intercooler. The carbon dioxide is delivered to the second stage compressor from mixing cylinder 12 at a temperature of 50° F. because of its admixture with the much colder gas coming through pipe 78. It is then delivered from the second stage compressor at a pressure of 325 pounds and a temperature of 226° F. In the intercooler 16 it suffers a reduction in temperature of 80° F. and is delivered at that temperature to the mixing cylinder 20. The carbon dioxide is then delivered to the third stage compressor from the mixing cylinder 20 at a temperature of 43° F. by reason of admixture with the relatively colder gas coming through pipe 82. The carbon dioxide is then delivered from the third stage compressor to the oil trap 24 at a pressure of 1025 pounds gauge and a temperature of 196° F. It is then delivered through the oil trap 24, the filters 28 and through the condensers 30 and 32 to the receiver 34 where it is collected at a temperature of 80° F.

The liquid carbon dioxide is then delivered at this temperature and a pressure of 1025 pounds gauge through the expansion valve 38 into flash tank 39 where it is collected at a temperature of 44° F. and a pressure of 600 pounds gauge. It is then delivered into flash tank 43 through the expansion valve 42 where it is collected at a temperature of 3.6° F. and a pressure of 325 pounds gauge. Finally it is collected in flash tank 47 at a temperature of −62° F. and a pressure of 90 pounds gauge by passage through the expansion valve 46. The liquid is then delivered to the discharge nozzle 50 at its temperature and pressure through which it is expanded to a pressure slightly above atmospheric pressure, for example, about one pound gauge and a temperature of −75° F. This temperature and pressure condition within the chamber A is sufficient to effect a transformation of the liquid carbon dioxide into solid carbon dioxide and gaseous carbon dioxide. The solid carbon dioxide is, of course, at a much lower temperature whereas it is the gaseous portion of the discharge which is at −75° F. and a pressure of one pound gauge. By the time the gas passes out into pipe 105 the temperature of the gas has risen to −100° F. and is delivered at this temperature into the gasometer 109 where it is collected at approximately a pressure of one pound gauge. A blower 111 creates a pressure of 10 pounds gauge for forcing the gas through the filter and purifiers and it passes through pipe 117 into mixing cylinder 4 at about 80° F. and a pressure sufficient to force it into the mixing cylinder.

The gas formed in flash tank 39 is delivered through the expansion or pressure reduction valve 81 into pipe 82 at a pressure of 325 pounds gauge and a temperature of 3.6° F. where it mixes with gas under similar temperature and pressure conditions from flash tank 43. Gas is also delivered from liquid cylinder 71 through the expansion valve 35 into pipe 82 at a pressure of 325 pounds gauge and a temperature of 3.6° F. Thus the gas from these three sources is delivered through pipe 82 into mixing cylinder 20. Gas from flash tank 47 is delivered directly into pipe 78 at a temperature of −62° F. and a pressure of 90 pounds gauge. Gas is also delivered from liquid cylinder 65 through the pressure reducing valve 77 into pipe 78 being reduced from a temperature −24° F. and a pressure of 200 pounds gauge to a temperature of −62° F. and a pressure of 90 pounds gauge. This mixture of gases from these two sources passes through pipe 78 into mixing cylinder 12. Gas at a pressure of 80 pounds gauge and a temperature −67° F. is delivered from liquid cylinder 55 through the pressure reducing valve 74 into pipe 75 at a pressure of about four pounds gauge and a temperature of −103° F.

The liquid carbon dioxide delivered through pipe 61 to refrigerating coil 63 is at a temperature of −24° F. and a pressure of 200 pounds gauge after passing through the pressure reducing valve 62 so that it produces a temperature of approximately 0° F. in refrigerator 66. Liquid carbon dioxide is delivered through pipe 51 and expansion valve 52 to refrigerating coil 53 suffering a reduction in pressure from 90 pounds gauge to 80 pounds gauge and a temperature of −67° F. to produce a temperature of approximately −40° F. in refrigerator 56. Liquid carbon dioxide is delivered through pipe 67 through the pressure reducing valve 68 to refrigerating coil 69 of the refrigerator 72 at a temperature and pressure which will produce a temperature in the refrigerator of approximately 32° F. The liquid cylinders within the refrigerators also have a refrigerating effect upon the refrigerators because of the fact that liquid is maintained therein at a predetermined level as determined by the float valves and is gradually transformed into cold vapor which gradually escapes through the pressure reduction valves which are set to maintain a predetermined pressure condition and to produce as indicated the required pressure drops into the pipes which they control.

It will, of course, be understood that the pressures and temperatures given are subject to wide variation without departure from the scope of this invention and are also subject to the rate of flow of carbon dioxide in its liquid and gaseous states through the various parts of the system. The rate of flow of the carbon dioxide through the various parts of the system is controlled so that the proper temperatures and pressures are maintained and the proper quantities of carbon dioxide are supplied to the various parts of the system to provide a smooth continuous operation of the system.

The liquid carbon dioxide may be sprayed directly upon the product or upon the product with a wrapper thereon. In either case the carbon dioxide snow deposited on the surface thereof rapidly absorbs the contained heat. The apparatus and process may be controlled so that the products will issue from the freezer in any desired condition and at substantially any desired temperature. The quantity of carbon dioxide discharged may be controlled so that a thin layer of snow is deposited on the products or only a sufficient amount is deposited on them so that as they leave the freezer it has substantially all vaporized. This control will, of course, be apparent to those skilled in the art.

The freezer cabinet which comprises the chambers A, B, and C, is constructed so that these three spaces are separated by aperture walls having gates for controlling the apertures so that the articles may pass through these chambers without undue exposure of the spaces to the exterior through the apertures thereby preventing undue loss of carbon dioxide gas. Since the pressure of the carbon dioxide gas within chamber A is almost atmospheric pressure there is little tendency for the gas to escape into the atmosphere through the openings. The double door arrangements are preferably operated in sequence so that chamber A, is not open to chambers B and C when either of them is open to the atmosphere. By this operation a minimum loss of gas occurs.

The entrance of air into the shafts or chambers at the ends of the freezer is, of course, prevented as previously explained by reason of the greater specific weight of carbon dioxide and by reason of the fact that the pressure in the freezer is preferably slightly above atmospheric pressure.

The pressure drop valve 46 may be eliminated and a cooling coil employed in the third flash tank 47. In other words, the liquid may be further cooled in the third flash tank by heat exchange without pressure reduction. Thus pressure in the tanks 43 and 47 and up to valves 49 and 52 will be the same.

From the above disclosure it will be apparent that my invention resides in certain principles of construction operation and procedure which may be carried out by those skilled in the art in other ways and by other physical apparatus without departure from these principles. I do not, therefore, desire to be strictly limited to the disclosure as given for purposes of illustration but rather to the scope of the appended claims.

What I seek to secure by United States Letters Patent is:

1. In an apparatus of the type described, the combination comprising a chamber forming three compartments having communication therebetween, conveyors in each of the compartments arranged to deliver the articles thereon from one to the other in succession, means for controlling the communications between the compartments, a source of liquid carbon dioxide, and means for spraying the liquid carbon dioxide into one of said chambers.

2. In an apparatus of the type described, the combination comprising means forming a chamber, a conveyor within said chamber, a source of liquid carbon dioxide, means for spraying liquid carbon dioxide from the source into the chamber, and a discharge connection for the chamber including a pressure control valve for maintaining a predetermined pressure within the chamber.

3. In an apparatus of the type described, the combination comprising means for changing carbon dioxide gas into liquid carbon dioxide, means connected thereto for storing the liquid therein, a refrigerating chamber, a conveyor within said chamber, means connected to the liquid source for spraying liquid carbon dioxide into the chamber, and a connection between the chamber and said means for transforming carbon dioxide gas into liquid carbon dioxide whereby the gas formed in the chamber may be reliquefied, said connection including a control valve.

4. In an apparatus of the type described, the combination comprising means for changing carbon dioxide gas into liquid carbon dioxide, means connected thereto for storing the liquid therein, a refrigerating chamber, a conveyor within said chamber, means connected to the liquid source for spraying liquid carbon dioxide into the chamber, and a connection between the chamber and said means for transforming carbon dioxide gas into liquid carbon dioxide whereby the gas formed in the chamber may be reliquefied, said connection including a valve for maintaining a predetermined gas pressure within the chamber.

5. In an apparatus as described the combination comprising a substantially closed cabinet, a conveyor in said cabinet, means for spraying liquid carbon dioxide into said cabinet and onto said conveyor, a vertical casing at each end of said cabinet open at the top and opening near the bottom into said cabinet and a conveyor in one of said casings for carrying articles downwardly to the opening into said cabinet and a conveyor in the other casing for carrying articles upwardly from the opening into said cabinet, said cabinet and casings being filled with carbon dioxide gas when the apparatus is in operation to exclude air therefrom.

6. In an apparatus as described the combination comprising a cabinet forming a substantially closed chamber, means for spraying liquid carbon dioxide into said chamber, and vertical casings open at the top adjacent each end of said cabinet and opening into the chamber formed thereby, said casings providing means for delivering and removing articles from the cabinet chamber and normally filled with carbon dioxide gas when the apparatus is in operation to substantially exclude air from the chamber.

7. In an apparatus as described the combination comprising a cabinet forming a substantially closed chamber, means for spraying liquid carbon dioxide into said chamber, vertical casings open at the top adjacent each end of said cabinet and opening into the chamber formed thereby, said casings providing means for delivering and removing articles from the cabinet chamber and normally filled with carbon dioxide gas when the apparatus is in operation to substantially exclude air from the chamber, and means in each of said casings for delivering articles to and carrying them from said cabinet chamber.

8. The method of rapidly reducing the temperature of articles which comprises moving them along a defined path through a substantially closed chamber, spraying liquid carbon dioxide onto said articles with the formation of carbon dioxide gas, filling said space with the carbon dioxide gas and withdrawing the carbon dioxide gas at a rate to maintain a pressure within the space slightly above atmospheric pressure to exclude air from the space.

JUSTUS C. GOOSMANN.